2 Sheets—Sheet 1.

W. W. BURSON.
GRAIN BINDER.

No. 44,513. Patented Oct. 4, 1864.

Witnesses

Inventor
W. W. Burson

2 Sheets—Sheet 2.

W. W. BURSON.
GRAIN BINDER.

No. 44,513. Patented Oct. 4, 1864.

Witnesses
Cyrus T. Miller
Socrates Holmes

Inventor
W. W. Burson

UNITED STATES PATENT OFFICE.

W. W. BURSON, OF ROCKFORD, ILLINOIS.

IMPROVEMENT IN GRAIN-BINDERS.

Specification forming part of Letters Patent No. 44,513, dated October 4, 1864.

*To all whom it may concern:*

Be it known that I, W. W. BURSON, of the city of Rockford, in the county of Winnebago and State of Illinois, have invented a new and useful Grain-Binder; and I do hereby declare that the following is a full, clear, and exact description of the construction and operation of the same, reference being had to the annexed drawing, forming part of this specification, in the several figures of which similar characters of reference denote the same parts.

Figure 1:
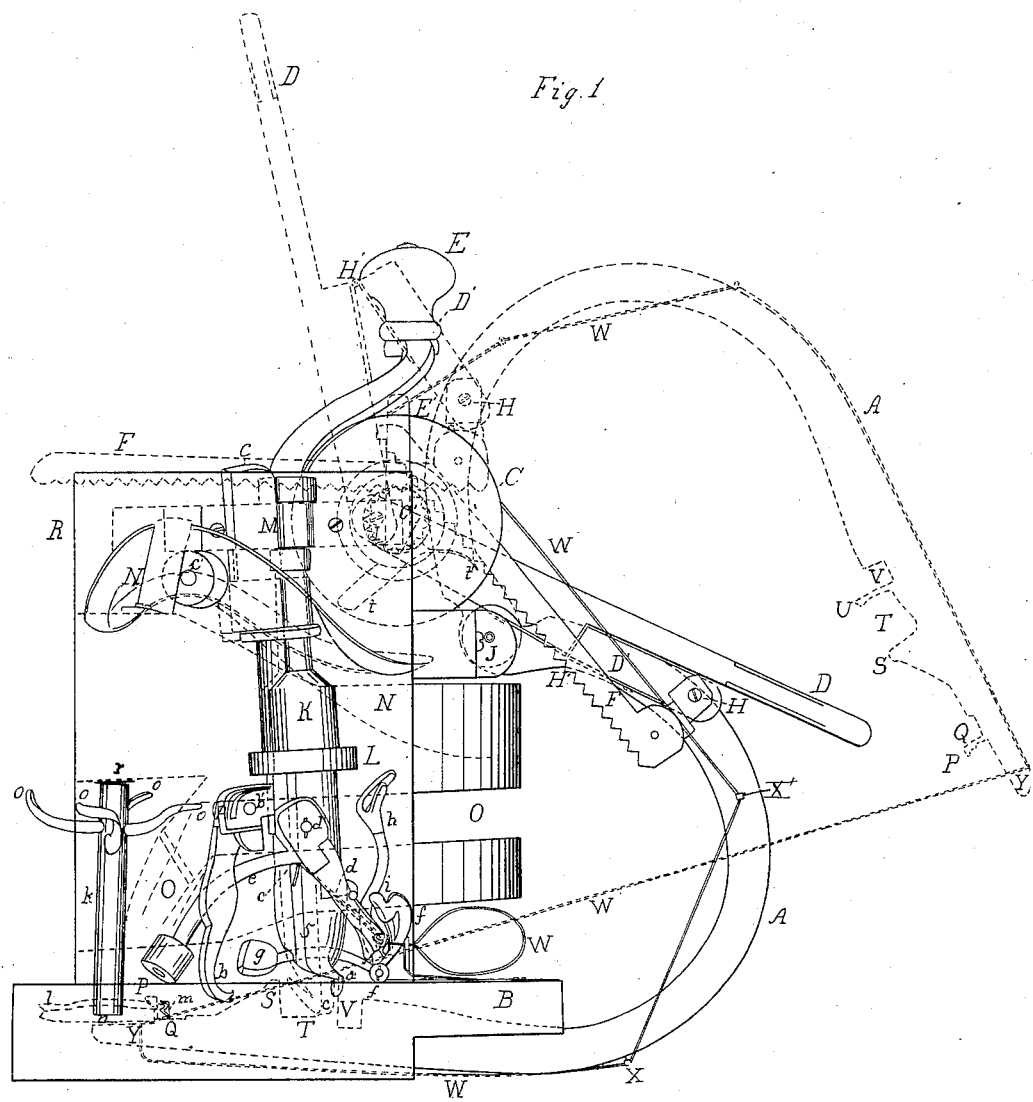
Figure 3:
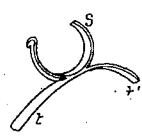
Figure 4:
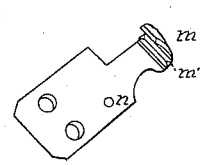
Figure 2:
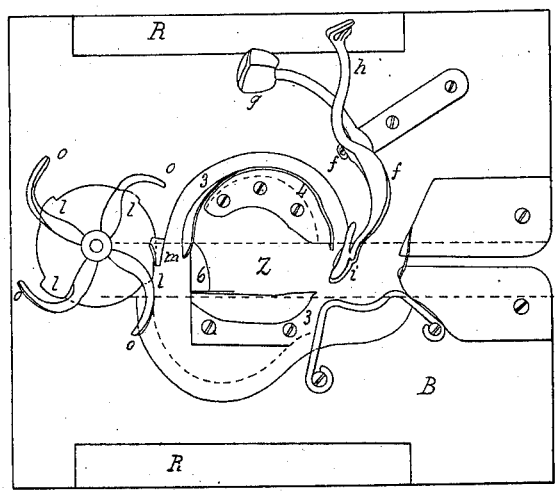

Figure 1 is a side elevation, the upright R being removed to show the tying devices. Fig. 2 is a plan view, the tying device being removed. Fig. 3 shows spool-spring $s$. Fig. 4 is a view of the stationary part $m$ of the cutting and holding device.

My invention has reference to the binding of grain upon the reaper-platform with twine, cord, or string, and consists of certain combination of devices hereinafter to be set forth.

In the drawing, Fig. 1, the vibrating-lever A is hinged at J to its support, which is secured to the uprights R R. The shaft K is supported in its bearings M and L, which latter covers the groove 5 made in said shaft K, in which hook $c$ moves, being raised and depressed by the arm $c'$ moving in cam-groove N, which surrounds shaft K. The fork $b$ is hinged to shaft K at $b'$, and rotates with said shaft, being properly guided by groove 3, constructed in the bed-piece of the binder, under shaft K, and eccentric to the axis of said shaft, and of sufficient depth and width to admit said fork and the twine, as hereinafter described, Fig. 2.

The swinging lever $d$ vibrates on its support $d'$ on shaft K, and is moved by arm $e$, guided in cam-groove O. The lever $f$, supporting foot $i$ on bearing $f'$, has on its rear end the weight $g$ and arm $h$, rising perpendicularly, is moved forward by contact with arm $e$ and backward by weight $g$. The spool C has wound upon it the twine or band material W in such manner that it shall unwind from the under side. The shaft $k$, pivoted at $r$ and $n$, has near its upper end the curved arms $o\ o\ o\ o$, and on the lower end the cutters $l\ l\ l\ l$, and turns one-fourth revolution for each revolution of shaft K, by which rotation the sheaf portion of the twine is cut from the spool portion, and the end of the latter retained for the next band.

In operation, this binder is placed upon the platform of any reaping-machine in such position that the grain can most readily be brought to it in proper order for binding. When the crank E is over the indicator E', and the lever A fully down under the tying device, all parts are said to be in position of rest.

The twine W is passed from the spool C, through the loops X' X and eyelet Y of curved lever A, the end drawn through and held in the hand while the lever is brought down to its place of rest under the tying device, when the hinge H' of handle D D', being below the range of hinges H and I, locks lever A when down, and prevents it from rising by the pressure of the gavel upon it.

By the above-described movement the twine W is brought between the point $a$ of shaft K and fork $b$, and is over the elevations P, S, and U, and the end being still held, the crank E is turned to the right one revolution, which should fasten the twine in the holding device $l\ m$. Drawing upward on handle D, lever A is raised, drawing the requisite length of twine from spool C; the gavel being brought within reach of lever A, the handle D is pushed down, bringing the two ends of the band together within the tying device. While lever A is being moved down, the ratchet-rod F is carried over the ratchet-pulley of spool C, turning back the spool and drawing upon the twine, insuring the band to be drawn tightly around the gavel, when the crank E is turned to the right, rotating shaft K, when fork takes in the twine at recess Q of lever A, carrying the twine into groove 3. At the same time stud $p$ passes within the curved arm and, by the continued revolution of shaft K, turns the cutters $l$, releasing the end of the twine, and carrying the continued thread in the cutters, the sheaf portion is severed from the spool portion, the end of the latter being held by the cutters $l\ m$, when stud $p$ has passed beyond the reach of arm $o$. The continued rotation of shaft K brings the end of arm $h$ of lever $f$, moving it forward against arm $h$ of lever $f$, moving it forward, the foot $i$ presses the twine into recess V, abling fork $b$ to pass over it in forming loop, when the weight $g$ brings the lever its position of rest. The fork $b$, follow groove 3, is brought under shaft K, carrying the ends of the band within reach of the hook c, which is raised by arm c' moving in cam-groove N, and draws the ends of band through the loop thus formed into the groove 5, when lever d, guided by cam-groove O, is thrown forward, whereby the knot formed around the lower end of shaft K is thrown off and carried to the side of the sheaf, thereby holding the band tightly around it.

In tying the knot, as just described, the following points are to be noted: First, the fork b is opened wide enough to insure the reception of the twine in passing through the recess Q of lever A, forming an acute angle, which form allows twine of different sizes to be drawn in tightly, and entering groove 3, is held firmly by the form of fork b, just described, and the severed ends of the twine pressing against the outer wall of said groove. To accommodate great unevenness of sizes in twine, the outer wall of said groove may be constructed of some elastic material, or held forward by properly-constructed springs, giving greater space for the twine to pass through. Instead of the fork and groove, just described, for holding the ends of the band, the fork could be arranged to close upon the twine by means of a spring, or, if hinged, could be closed by a stud moving in a cam-groove. By either of the above plans the same result is attained, viz, to securely hold the ends of the band, which are severed from the spool portion in the beginning of the tying process, while the loop is forming, enabling the ends to be drawn through said loop to form a perfect knot. Second, the curvature of groove 3 is nearly a section of a spiral curve, and should be at recess Q, the proper distance from shaft K, to insure sufficient length of twine to form the loop, and no more. This groove should approach the axis of shaft K just enough to save any strain upon the sheaf portion of the twine; but since the length of the twine wound about the foot of shaft K does not bring the fork b to the hook c, recourse is had to the rib 4, Fig. 2, constructed upon the bed-piece of the binder, between groove 3 and the end of shaft K, of proper height to keep the twine tight. It is designed to hold the band as first brought round the sheaf, neither drawing upon it endangering the breaking of it, nor allowing it to give back, thereby loosening the band before the knot is tied. Third, when the severed ends are brought to hook c, said hook draws them from fork b into groove 5, by arm c' moving in cam-groove N. The construction of hook c is very similar to that of fork b, in this, that it forms an acute angle, allowing twine of any size to be drawn tightly in, and the severed ends are pressed against the side of said above, thereby securely holding the ends while drawing the knot tightly. The ends are drawn any desired height, according to the construction of cam-groove N, and are released from hook c by a widening of groove 5 at the point of rest. Instead of the hook c moving in groove 5 for the purpose described, suitably-constructed pinchers, closed by a spring or cam-groove, could be used, the object arrived at being to hold the ends securely and draw them through the loop to form a perfect knot. Fourth, so soon as hook c has drawn the severed ends of the twine through the loop, as above described, a knot is formed about the point a, which, from its distance from the sheaf and the open character of the knot, would be very objectionable, to remedy which defects lever d is arranged to form a part of the rim, holding the loop until the ends are drawn through, when the lower end of said lever is moved forward by the action of arm e moving in cam-groove O; the already-formed knot is thus carried forward to the side of the sheaf. The distance and line of movement of said lever can be regulated by the relative position of bearing d and cam-groove O. Fifth, the stationary part of cutting and holding device m, Fig. 4, is constructed with cutting-edge on the upper surface, roughened ridge or elevation m' in the middle, and notch or square offset on the lower surface. The rotary cutters l l l l, matching the cutter m, rotating as before described brings the twine between the cutting-edges, severing it, and by the pressure in the corrugated holders securely retains it. To prevent the severed ends being carried through the cutter m, the ridge m' is notched or roughened, thereby preventing the end from being carried through.

The end of lever A is constructed with the eyelet Y, elevation P, recess Q, elevation S, recess T, bridge U, and recess V, which construction brings the twine within reach of the tying device and permits the proper movements of the same.

Raising the lever A moves the ratchet-rod F over the ratchet-pulley of spool C; the weighted end of spool-spring t, aided by the friction of the spring s, Fig. 3, brings the end of the spring between the notches of ratchet-rod F and the spool-pulley ratchet, thereby permitting the spool to turn freely in giving off the twine; the end t' resting against ratchet-rod F, prevents the ratchet turning with the spool. When lever A is moved downward the ratchet-rod is drawn forward, which moves the spool-spring back, allowing the notches of ratchet-rod and ratchet-pulley to come together, whereby the spool is turned back, drawing the band tightly around the gavel. The amount of tension thus brought upon the band can be regulated by a weight or spring acting upon ratchet-rod F and ratchet-pulley.

What I claim as my invention, and desire to secure by Letters Patent, is—

1. Hinging fork b to shaft K, in such manner that the fork and shaft shall be on opposite sides of the twine, in position of rest, whereby a loop is formed in the twine by their rotation, as described.

2. The arrangement of fork b and groove 3, constructed substantially as described, and for the purpose set forth.

3. The combination of the rib 4 with groove 3 and fork b, acting substantially as described.

4. The combination of depresser i with fork b, as set forth.

5. The combination of hook c, groove 5, and shaft K, operating substantially as described.

6. The combination of lever d with a tying device, operating substantially as described and for the purpose set forth.

7. The construction and operation of the cutters l and m, substantially as described.

8. A tying device, constructed and operating substantially as described, whereby the sheaf portion of the twine is cut from the spool portion before the knot is tied, and whereby the knot is tied without straining upon the sheaf portion during the tying process, for the purpose set forth.

9. The combination of ratched spool-pulley C′, ratchet-rod F, and spool-spring s, substantially as described.

10. The combination of the jointed handle D D′ and vibrating-lever A, arranged to lock the said lever when it is fully down, substantially as set forth.

W. W. BURSON.

Attest:
CYRUS F. MILLER,
DERASTUS HOLMES.